(12) United States Patent
Correale, Jr. et al.

(10) Patent No.: US 6,587,905 B1
(45) Date of Patent: Jul. 1, 2003

(54) DYNAMIC DATA BUS ALLOCATION

(75) Inventors: Anthony Correale, Jr., Raleigh, NC (US); Richard Gerard Hofmann, Apex, NC (US); Peter Dean LaFauci, Holly Springs, NC (US); Dennis Charles Wilkerson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 09/606,463

(22) Filed: Jun. 29, 2000

(51) Int. Cl.$^7$ ............................................... G06F 13/00
(52) U.S. Cl. ....................... 710/107; 710/110; 710/244
(58) Field of Search ................................. 710/107, 110, 710/116, 123, 309, 240, 244

(56) References Cited

U.S. PATENT DOCUMENTS

| | | | | |
|---|---|---|---|---|
| 4,245,344 A | | 1/1981 | Richter ..................... 340/146.1 |
| 5,282,174 A | | 1/1994 | Little ..................... 365/230.05 |
| 5,408,676 A | | 4/1995 | Mori .......................... 395/800 |
| 5,459,839 A | | 10/1995 | Swarts et al. ............... 395/650 |
| 5,640,600 A | * | 6/1997 | Satoh et al. .................... 710/33 |
| 5,745,732 A | | 4/1998 | Cherukuri et al. .......... 395/495 |
| 5,761,458 A | | 6/1998 | Young et al. ................ 395/308 |
| 5,862,353 A | | 1/1999 | Revilla et al. .............. 395/287 |
| 5,884,051 A | | 3/1999 | Schaffer et al. ............. 395/287 |
| 5,893,921 A | | 4/1999 | Bucher et al. ............... 395/473 |
| 5,925,118 A | * | 7/1999 | Revilla et al. ............... 710/110 |
| 6,081,860 A | * | 6/2000 | Bridges et al. ............. 710/110 |
| 6,430,641 B1 | * | 8/2002 | Hofmann et al. ........... 710/240 |
| 6,513,089 B1 | * | 1/2003 | Hofmann et al. ........... 710/309 |

\* cited by examiner

Primary Examiner—Sumati Lefkowitz
Assistant Examiner—X. Chung-Trans
(74) Attorney, Agent, or Firm—Scott W. Reid; Winstead, Sechrest & Minick, P.C.

(57) ABSTRACT

A high performance integrated circuit (IC) with independent read and write data busses enables full simultaneous read and write data transfers between devices coupled to the buses. Multiple master and multiple slave devices communicate using the resources of a bus controller and a bus arbiter. Having separate read and write data busses with separate and independent arbitration allows reads and writes from different devices to occur simultaneously. Many high performance IC, like systems on a chip (SOC), have many different functional units communicating with a central processing unit (CPU). Many such CPUs have architectures that may cause in certain applications an unbalance between read and write traffic on the independent busses. Master and slave devices contain auxiliary internal read and write data buses multiplexed such that read or write data may be interchanged. A corresponding Auxiliary_(read or write) command is routed to the slave units to notify the units when to route normal read or write data to an idle bus. The bus controller may use this added feature to optimize the available bandwidth of independent read and write data busses up to the limit where a read or write bandwidth may be two times that available if the read and write data buses were used only for their normal traffic.

6 Claims, 10 Drawing Sheets

DYNAMIC DATA BUS ALLOCATION

TECHNICAL FIELD

The present invention relates in general to data processing systems, and in particular, to bus systems with independent read and write data buses.

BACKGROUND INFORMATION

Recent advances in silicon densities now allow for the integration of numerous functions onto a single silicon chip. With this increased density, peripherals formally attached to the processor at the card level are now integrated onto the same die as the processor. As a result, chip designers must now address issues traditionally handled by the system designer. In particular, the on-chip buses used in such system-on-a-chip (SOC) designs must be sufficiently flexible and robust in order to support a wide variety of embedded system needs.

The IBM Blue logic core program, for example, provides the framework to efficiently realize complex system-on-a-chip designs. Typically, an SOC contains numerous functional blocks representing a very large number of logic gates. Designs such as these are best realized through a macro-based approach. Macro-based designs provide numerous benefits during logic entry and verification, but the ability to reuse intellectual property is often the most significant benefit. From generic serial ports to complex memory controllers and processor cores, each SOC generally requires the use of common macros.

Many single chip solutions used in applications today are designed as custom chips, each with their own internal architecture. Logical units within such a chip are often difficult to extract and reuse in different applications. As a result, many times the same function is redesigned from one application to another. Promoting reuse by ensuring macro interconnectivity is accomplished by using common buses for to inter-macro communications. The IBM CoreConnect architecture, for example, provides three buses for interconnecting cores, library macros, and custom logic. These buses are the Processor Local Bus (PLB), On-chip Peripheral Bus (OPB) and Device Control Register (DCR) Bus. Other chip vendors may have similar SOC core architectures, for example the Advanced Microcontroller Bus Architecture (AMBA) commercially available from ARM Ltd.

Figure 1:
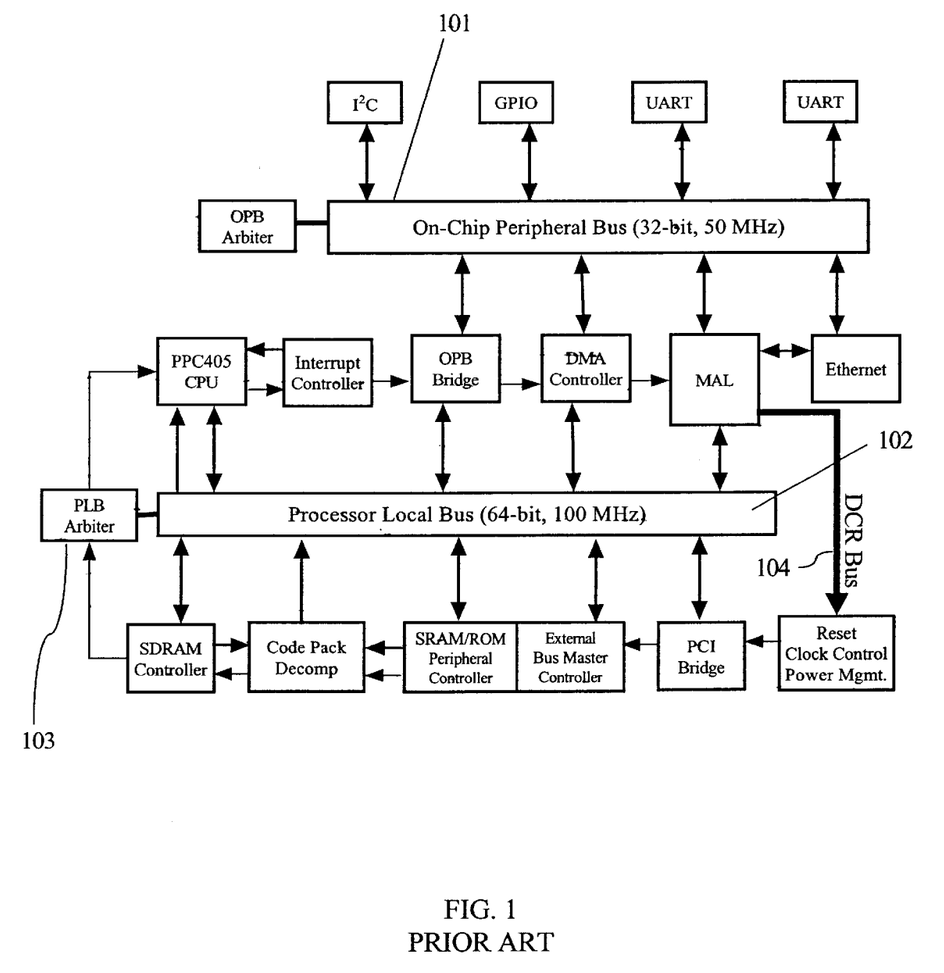
FIG. 1 is a detailed block diagram of the interconnect macros in the prior art Power PC 405GP embedded controller.

FIG. 1 illustrates how the prior art CoreConnect architecture is used to interconnect macros in the PowerPC 405 GP embedded controller. High-performance, high bandwidth blocks such as the Power PC 405 CPU core, PCI bridge and SDRAM controller reside on the PLB 102, while the OPB 101 hosts lower data rate peripherals. The daisy chain DCR bus 104 provides a relatively low-speed data path for passing configuration and status information between the PowerPC 405 CPU core and other on-chip macros. A PLB Arbiter 103 would handle contention between devices on PLB 102.

The CoreConnect architecture shares many similarities with other advanced bus architecture in that they both support data widths of 32 bits and higher, utilize separate read and write data paths and allow multiple masters. For example, the CoreConnect architecture and AMBA 2.0 now both provide high-performance features including pipelining, split transactions and burst transfers. Many custom designs utilizing the high-performance features of the CoreConnect architecture are available in the marketplace today.

In most SOC designs the CPU is a key element of the chip. Modern RISC based CPUs often require a large number of memory read operations to run a particular application. This is caused by several factors. One factor is that complex operations are made up of long streams of simple instructions. These instructions sometimes may exist in a local cache. Often the relatively small size of the cache or the non-locality of reference code will force misses or line memory read operations. Several newer CPUs are superscalar and have multiple execution pipelines which can multiply the number of read transfers required. Since the capability exists to manufacture so many transistors on a chip, many other complicated functions such as graphics, communications, and DMA controllers may also be integral to the chip. All these factors contribute to the need for a bus structure which may provide large amounts of memory read traffic. Depending on a particular application, read data bus traffic may be two to three times more than write data bus traffic. In an SOC design, the utilization of the on-chip bus structure is an important consideration. Efficient use of the bus produces better system throughput and response maps to real-time applications. An implementation of a high performance on-chip bus architecture is the IBM CoreConnect (trademark) Processor Local Bus (PLB). This bus structure contains separate read and write data busses for simultaneous read and write transfers. The PLB bus structure allows multiple slave devices to communicate with multiple master devices under the control of a central bus arbitration unit. The arbiter grants requesting masters control of the bus to communicate with the various slaves. There are, as stated above, separate read and write data and control buses coupled to a common address and transfer qualifier bus. This arrangement allows for read and write operations to be simultaneously performed or "overlapped". In a system running an application with two to three times more reads than writes, the write data bus has the potential to be idle for a large percentage of the time. There is clearly a need to have a bus architecture which maintains the normal read and write simultaneous overlapped transfers while offering a dynamic option to further utilize idle bus time when an unbalance between read and write traffic results when executing a specific application.

SUMMARY OF THE INVENTION

In a bus structure that has independent read and write data busses, the bus arbiter determines when there is an unbalance between the read and write traffic. An added auxiliary read data bus is added to the slave devices coupled to a bus arbiter. When the bus arbiter determines there is an unbalance in the read traffic and additional read bandwidth is needed, the bus arbiter asserts an auxiliary read command to the slave devices. A slave device claiming the auxiliary read, sends its read data to the bus arbiter on the added auxiliary read data bus. The slave device claiming the auxiliary read sends one or more write data acknowledges to the bus arbiter, depending on the transfer size. The bus arbiter, in response to the auxiliary read data acknowledge, routs the auxiliary read data to the appropriate master and conveys the slave write data acknowledge to the master read data acknowledge. By routing the write data acknowledge to the read data acknowledge of the master the bus system appears to be executing a normal read data transfer. If pending priority requests indicate that the bus needs to revert to its normal functionality then the auxiliary commands may be de-asserted and the normal read and write independent bus structure may be again established. For the allocated period of time the independent read and write data buses appear (from a bandwidth perspective) as dual read data busses. Other embodiments use tri-state bi-directional busses where a separate auxiliary read data bus does not need to be added. In this embodiment, a bi-directional write data bus has the functionality of a uni-directional write data bus and an added uni-directional auxiliary read data bus.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Embodiments of the present invention add signals to the signals typically used in the control of a bus, for example the Processor Local Bus (PLB) architecture. The description of embodiments of the present invention will use elements of the IBM CoreConnect architecture with the understanding that other similar architectures may correspondingly employ embodiments of the present invention.

Figure 2:
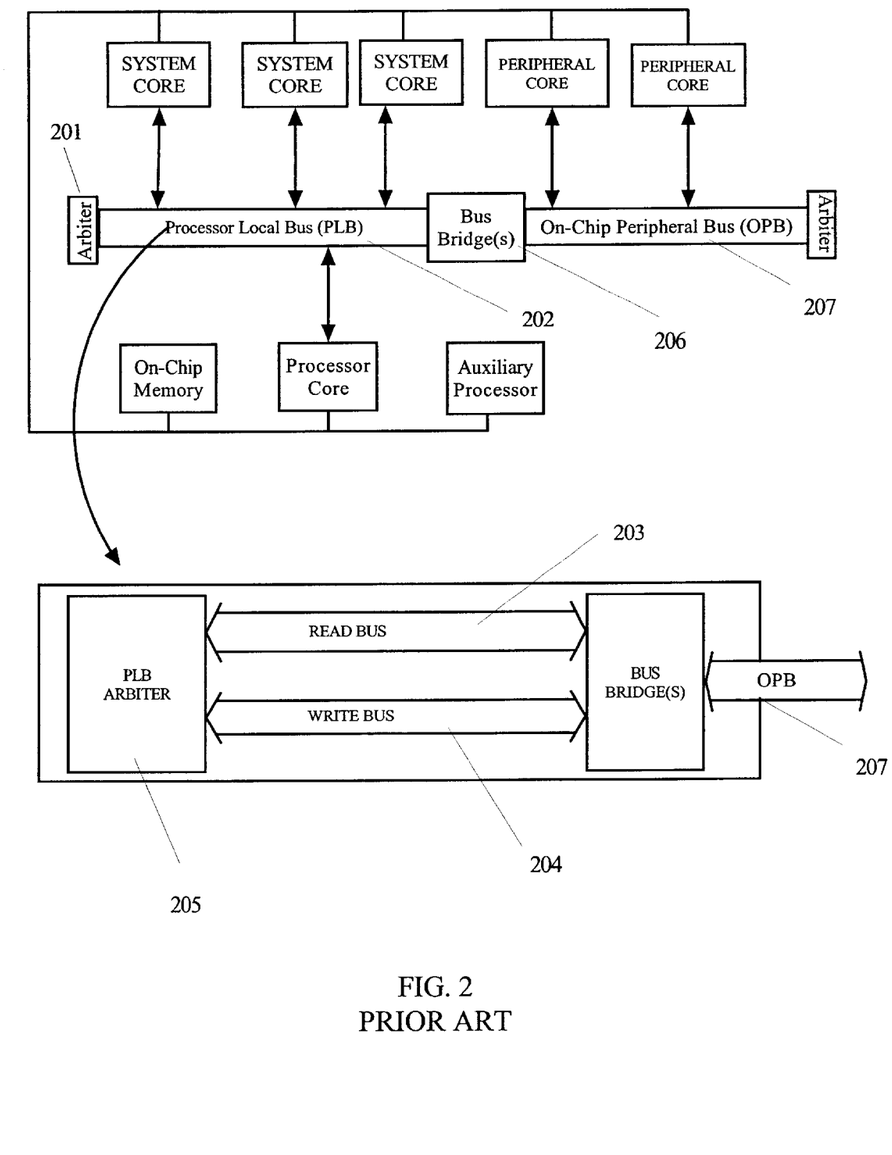
FIG. 2 is a simplified diagram of the interconnect macros on the Processor Local Bus (PLB) and the On-Chip Peripheral Bus (OPB) illustrating independent PLB read and write data buses.

FIG. 2 illustrates the prior art IBM CoreConnect architecture with Processor Local Bus (PLB) 202 and On-Chip Peripheral Bus (OPB) 207 connected via a Bus Bridge 206. The PLB 202 is the high speed bus and typically comprises a separate read data bus 203, write data bus 204 and PLB Arbiter 205. PLB Arbiter 205 would handle contention for the buses by exemplary devices, the system core, the Processor core, etc.

Figure 3:
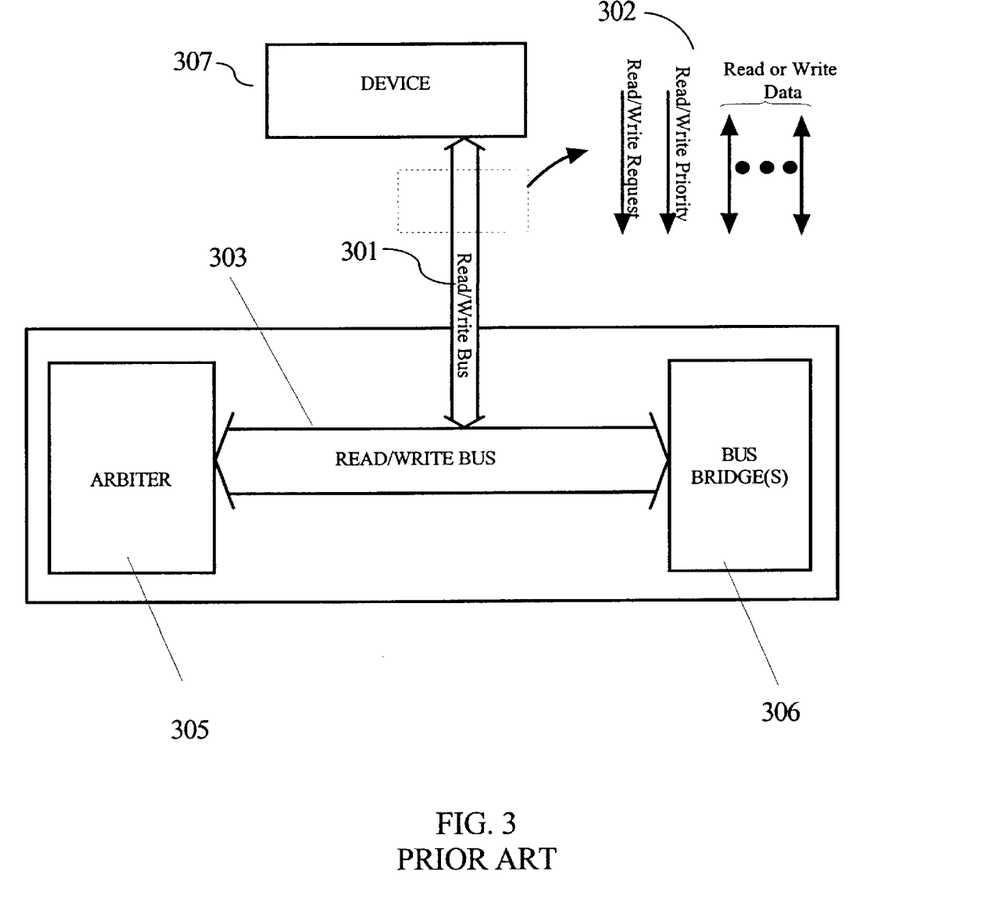
FIG. 3 is an illustration of a prior art read/write data bus.

FIG. 3 is a more detailed illustration of prior art read write data bus 303 coupled to an exemplary device 307 via a read/write data bus 301. Arbiter 305 would handle contention for bus 303 by device 307 and other devices (not shown). Bus signals 302 are separated into a request, read/write, priority, and read and write data signals. In this prior art illustration, a device requests the bus and is granted access to either the read or write facilities. Contending devices (not shown) would have a priority for a read or a write operation. Bus Bridge 306 would connect the bus 303 to other buses.

Figure 4:
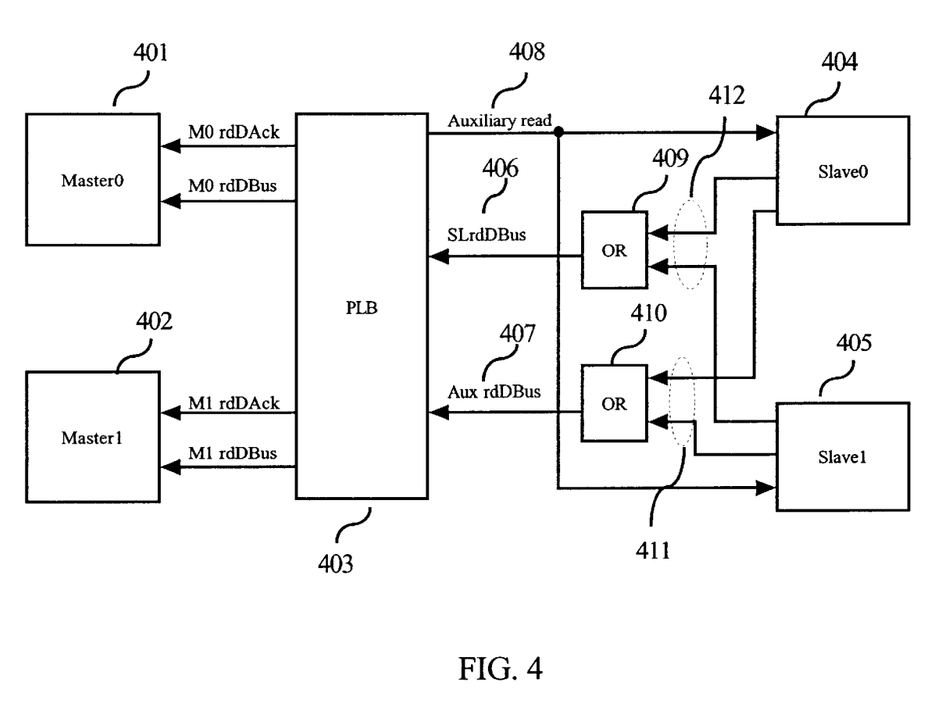
FIG. 4 is a circuit block diagram illustrating control signals in embodiments of the present invention.

A schematic of some of the elementary data bus control signals is shown in FIG. 4. In FIG. 4, a Master0 401 and Master1 402 have corresponding read data acknowledge signals M0 rdDAck and M1 rdDAck respectively. Each master also has a read data bus input M0 rdDBus and M1 rdDBus respectively. Slave devices Slave0 404 and Slave1 405 use OR gates 409 and 410 respectively to create read data buses SLrdDBus 406 and Aux rdDBus 407. PLB Arbiter 403 has circuitry that steers the buses SLrdDBus 406 and Aux rdDBus 407 to the appropriate read data bus inputs of exemplary master Master0 401 and Master1 402 when Auxiliary_Read 408 is asserted.

Figure 9:
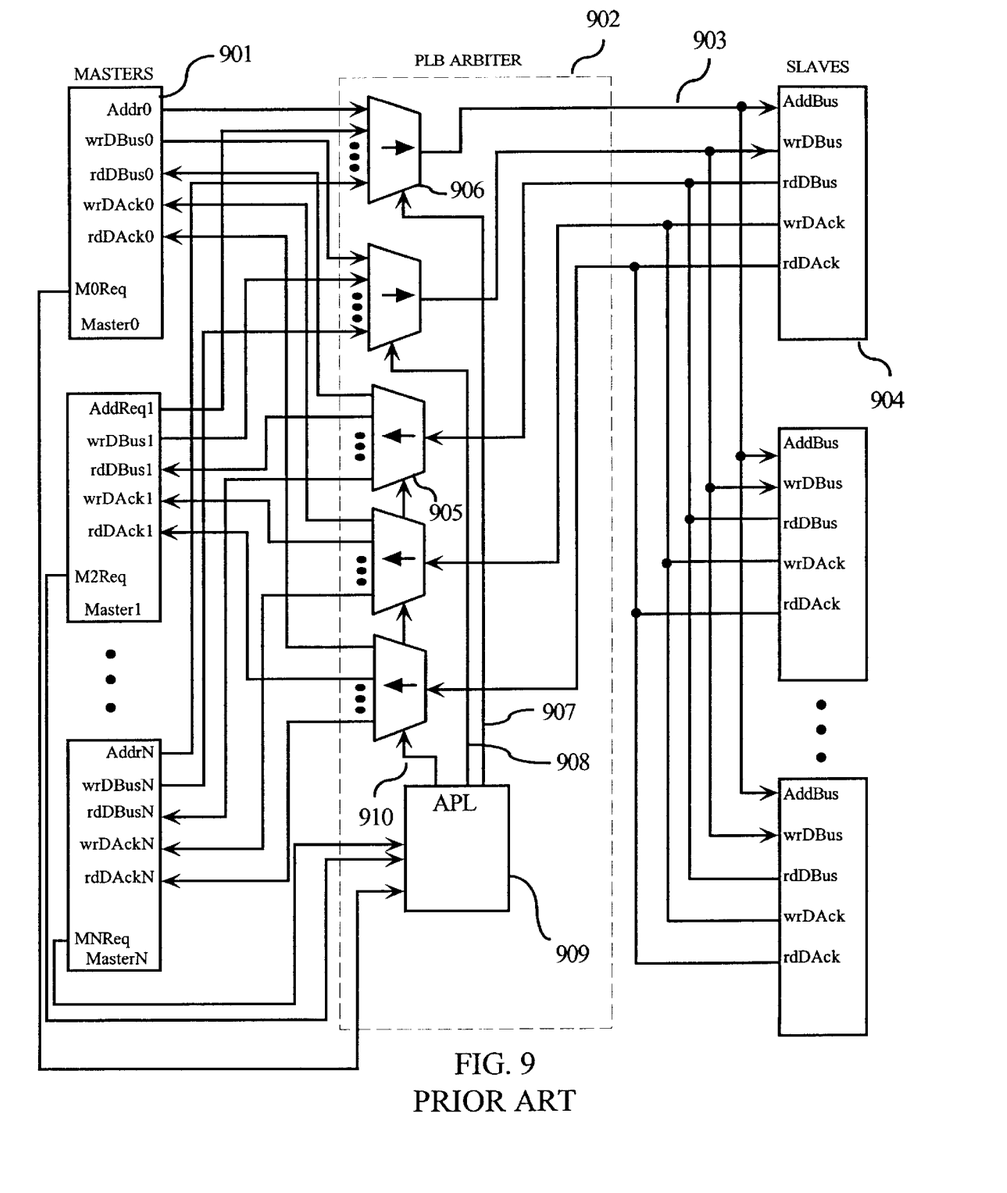
FIG. 9 is a prior art bus configuration used in the IBM CoreConnect bus system.

FIG. 9 is a prior art bus system where a number of master devices (e.g., 901) are coupled to slave devices (e.g., 904) through a PLB Arbiter 902. On the slave side of the PLB Arbiter 902 the signal lines are all bused to the slave devices (e.g., AddBus 903). This is a physical bus created by an on chip multi-drop net. Addresses by the masters are routed to the AddBus 903 using a multiplexer (e.g., 906). Read and Write requests are arbitrated by the PLB arbiter logic. The arbiter selects the highest priority request and steers the given master's address and controls onto a "bus" to the slaves through multiplexer 906 Addresses and write data come from the masters and are arbitrated and routed, by the PLB arbiter 902, to the corresponding address bus and write data bus on the slave device side of the PLB Arbiter 902. Read data (rdDBus), write data acknowledge (wrDAck) and read data acknowledge (rdDAck) come from the slaves and are routed via de-multiplexers (e.g., 905) to a particular master. While the read data bus (rdDBus) and the write data bus (wrDBus) are independent and may each simultaneously have read and write data traffic, an is unbalance in read and write traffic cannot be handled by this prior art bus structure.

When a system (e.g., SOC) has an unbalance in read and write traffic on independent read and write data busses, there will be times when one of the data transfer paths is idle. Although the data traffic may be either weighted more to reads or writes, most often it is necessary to perform two to three times more read operations that write operations. This means that the independent write data bus will be idle for a high percentage of time during such an application. In embodiments of the present invention an auxiliary read data bus (rdDBusAux) 1011 is added to each slave device (see FIG. 10). Each slave device has its rdDBusAux ORed in OR logic 1003 creating an auxiliary read data bus 1012. Correspondingly, rdDBus lines which previous were tied together creating the read data bus (see FIG. 9) are likewise ORed in OR logic 1002 creating the normal read data bus

Figure 10:
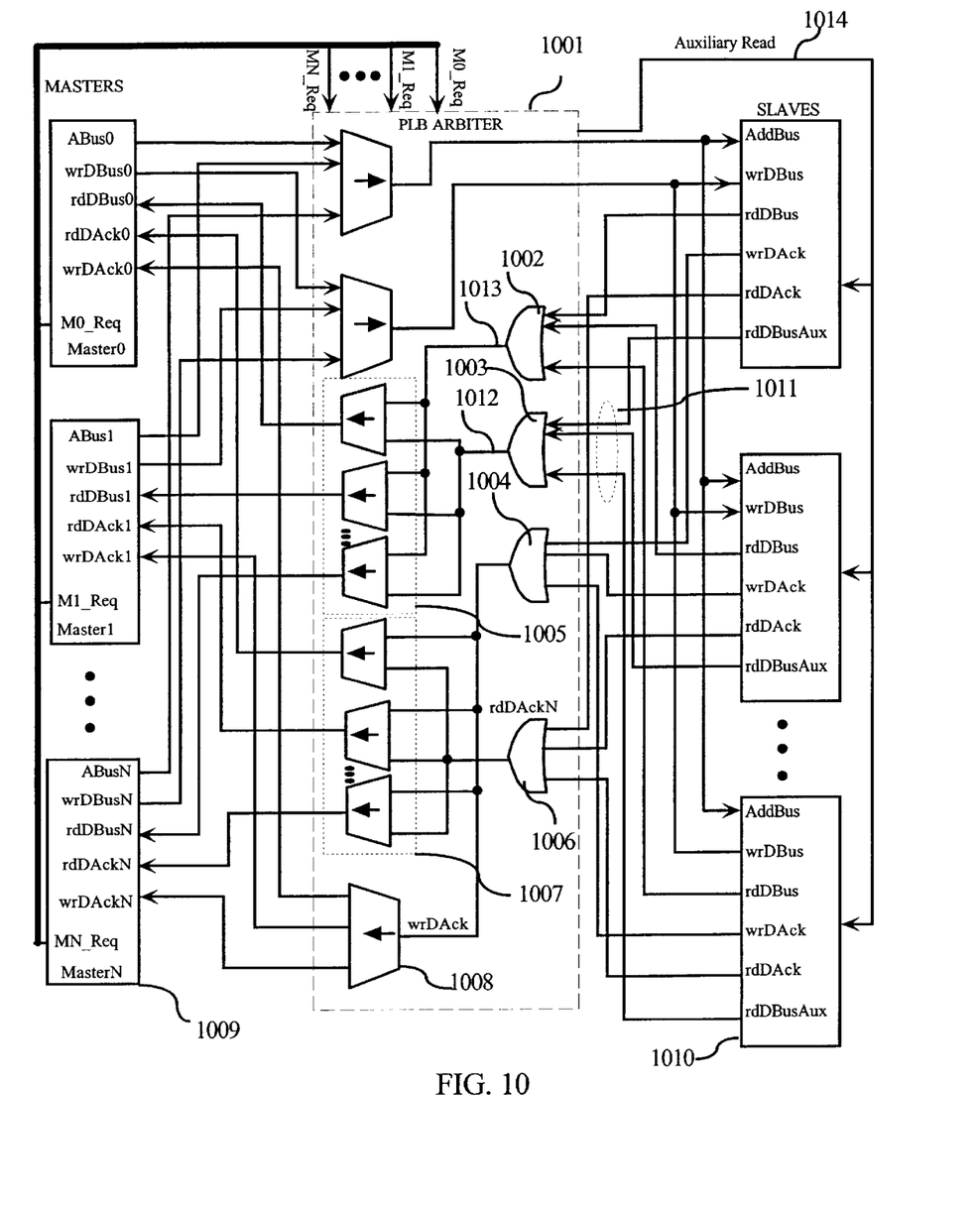
FIG. 10 is a circuit block diagram of embodiments of the present invention.

1013. In this embodiment of the present invention, the arbiter detects the under utilization of the write data bus and asserts a signal, Auxiliary_read 1014, to all the slave devices during the broadcast of a read cycle. The slave device claiming this read cycle, with Auxiliary_read asserted, may then provide read data to the auxiliary read data bus 1012 via its rdDBusAux lines. The slave device will then use the write data acknowledge (wrDAck) signal to notify the arbiter of the availability of auxiliary read data. The wrDAck signals from all the slave devices are ORed in OR gate 1004. If a write cycle was asserted, de-multiplexer 1008 would steer the wrDAck to the appropriated master. However, since an Auxiliary Read is active the arbiter will route the wrDAck to the rdDAck of the master scheduled to receive the data on the rdDBusAux 1012. The arbiter will steer the wrDAck to the appropriate masters' rdDAck signal input (e.g., rdDBus0). The arbiter will also steer the auxiliary rdDBusAux 1012 to the master's rdDBus input (e.g., rdDBus0). In this manner the response to the master is the same whether a regular read cycle or an auxiliary read cycle occurred from the slave device and backward compatibility is preserved.

Figure 5:
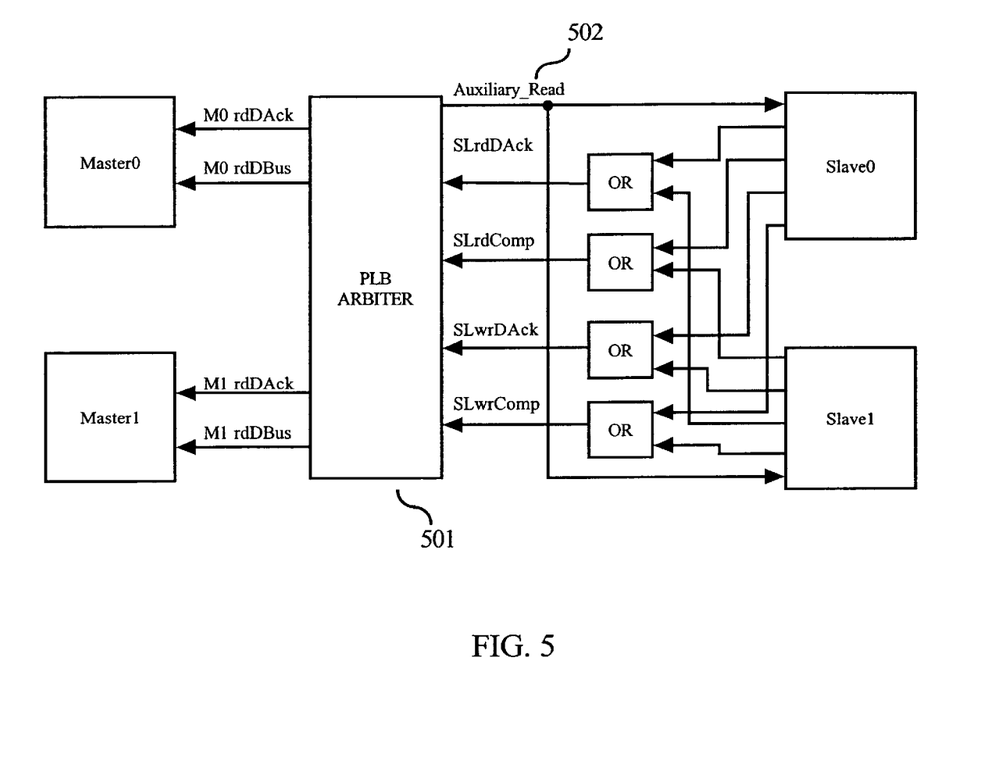
FIG. 5 is a circuit block diagram illustrating signals used in embodiments of the present invention.

FIG. 5 illustrates bus control signals used in embodiments of the present invention. When the auxiliary read cycle (Auxiliary_Read asserted) is completed, the slave device that claimed this cycle, will assert a write complete signal (SL_wrComp) following the functional guidelines for a read complete signal (SL_rdComp). In embodiments of the present invention, a functional guideline for asserting a read complete requires it to occur one clock cycle prior to the last Auxiliary_read data acknowledge (SL_rdDAck). The PLB Arbiter 501 will monitor this signal (write complete) and either de-assert Auxiliary_read 502 and begin a write cycle if a write request is pending or the PLB Arbiter 501 will allow another auxiliary read to be performed if no write request is pending, a read request is pending, and the read data bus is busy. Note that the diagrams in FIG. 4 and FIG. 5 illustrate a connection of two different slaves and masters, however, in embodiments of the present invention the same slave may potentially accept a regular and auxiliary read and provide data simultaneously on both data busses (SLrdDBus 411 and Aux rdDBus 412) and the data may be routed to two different masters (e.g. Master0 401 and Master1 402).

Embodiments of the present invention may also be implemented using tri-state data buses. Using tri-state buses (not shown) with bi-directional communication, an additional auxiliary read data bus would not have to be added. The write data bus itself would be used to transmit excess read data traffic in the same way as the separate auxiliary read data bus. A tri-state bi-directional write data bus has the same functionality as a uni-directional write data bus combined with a uni-directional auxiliary read data bus. In this case the slave is required to change from input buffers only to bi-directional driver logic.

Figure 7:
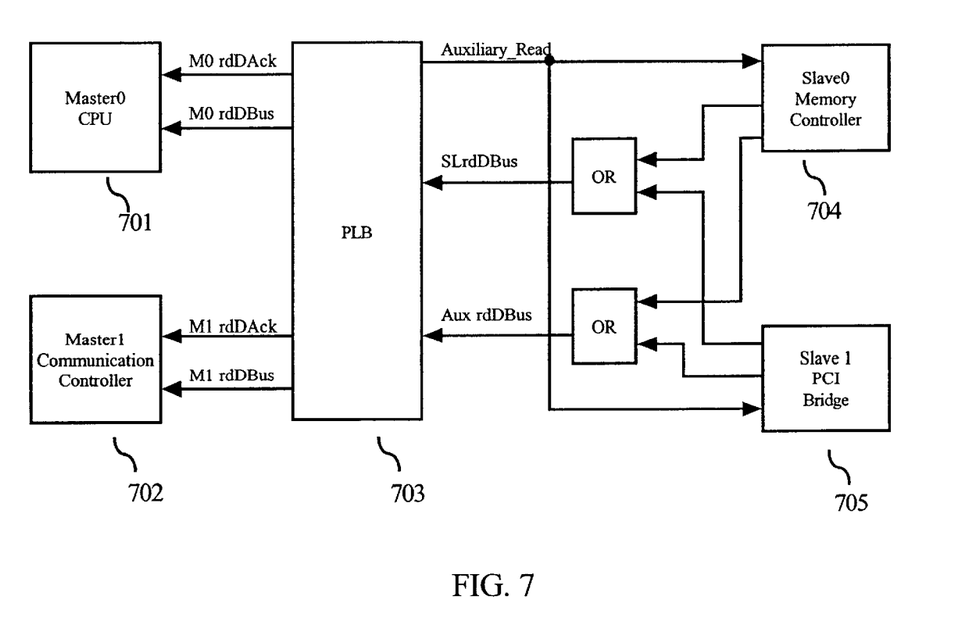
FIG. 7 illustrates an embodiment of the present invention.

FIG. 7 illustrates one embodiment of the present invention with a bus system with PLB Arbiter 703 wherein Master0 is a CPU 701, Master1 is a communications controller 702, Slave0 is a memory controller 704 and Slave1 is a PCI bridge 705. In this embodiment data may be read by the CPU 701 from the memory controller 704 at the same time that data is being read by the communications controller 702 from the PCI bus (not shown) via PCI bridge 705. It is easy to see from this example that embodiments of the present invention may be used to improve the memory bandwidth of a CPU and also improve overall system throughput.

Figure 6:
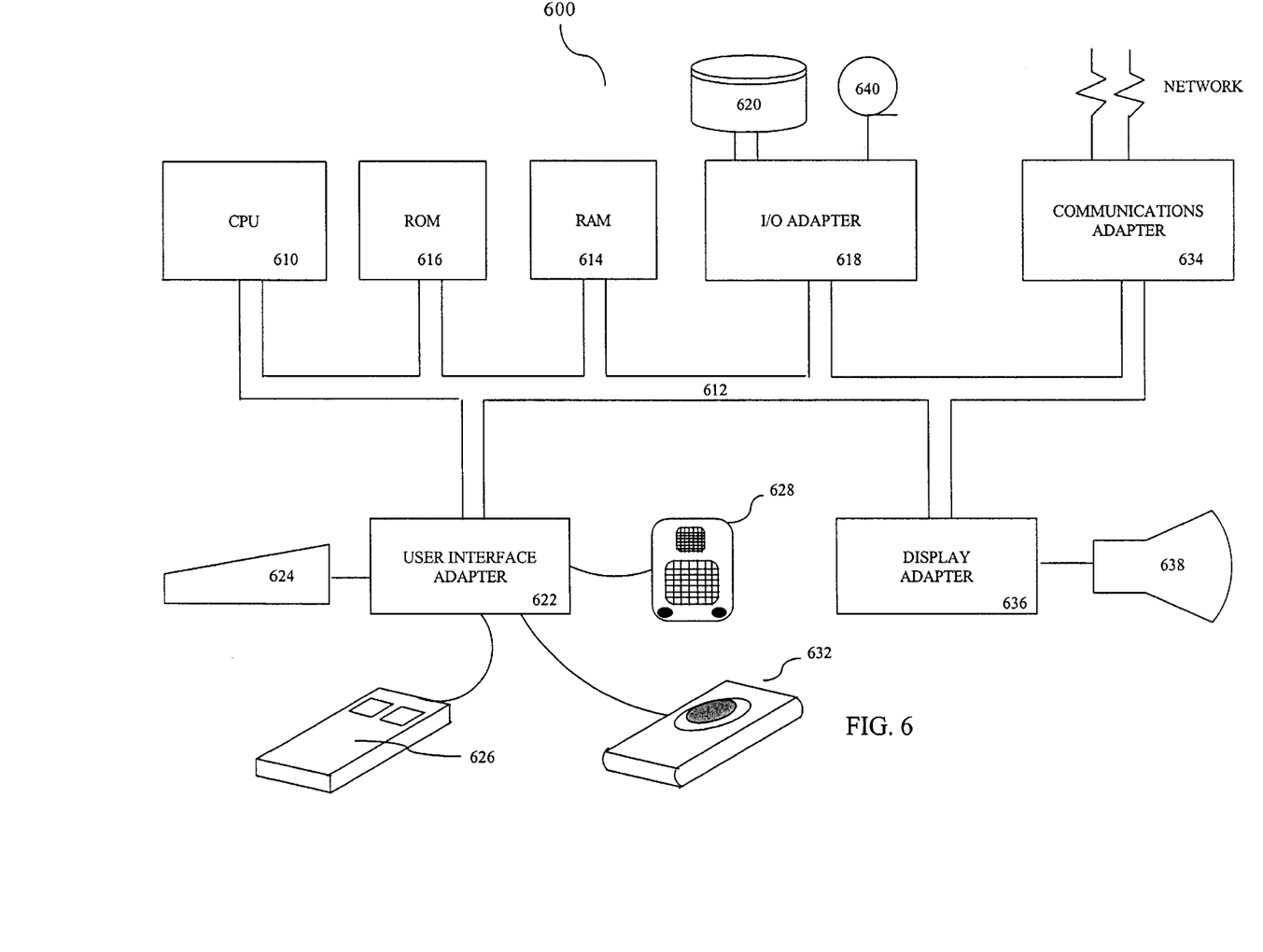
FIG. 6 is a data processing system configured in accordance with of the present invention.

Referring to FIG. 6, an example is shown of a data processing system 600 which may be used for the invention. The system has a central processing unit (CPU) 610, which is coupled to various other components by system bus 612. Read-only memory ("ROM") 616 is coupled to the system bus 612 and includes a basic input/output system ("BIOS") that controls certain basic functions of the data processing system 600. Random access memory ("RAM") 614, I/O adapter 618, and communications adapter 634 are also coupled to the system bus 612. I/O adapter 618 may be a small computer system interface ("SCSI") adapter that communicates with a disk storage device 620. Communications adapter 634 interconnects bus 612 with an outside network enabling the data processing system to communicate with other such systems. Input/Output devices are also connected to system bus 612 via user interface adapter 622 and display adapter 636. Keyboard 624, track ball 632, mouse 626 and speaker 628 are all interconnected to bus 612 via user interface adapter 622. Display monitor 638 is connected to system bus 612 by display adapter 636. In this manner, a user is capable of inputting to the system through the keyboard 624, trackball 632 or mouse 626 and receiving output from the system via speaker 628 and display 638.

Various buses may be employed in the data processing system 600 and as such may employ embodiments of the present invention wherein unbalanced bus traffic is sensed and bus bandwidth is increased for one of the types of bus traffic. The data processing system may use separate auxiliary busses or tri-state bi-directional data busses and employ embodiments of the present invention.

Figure 8:
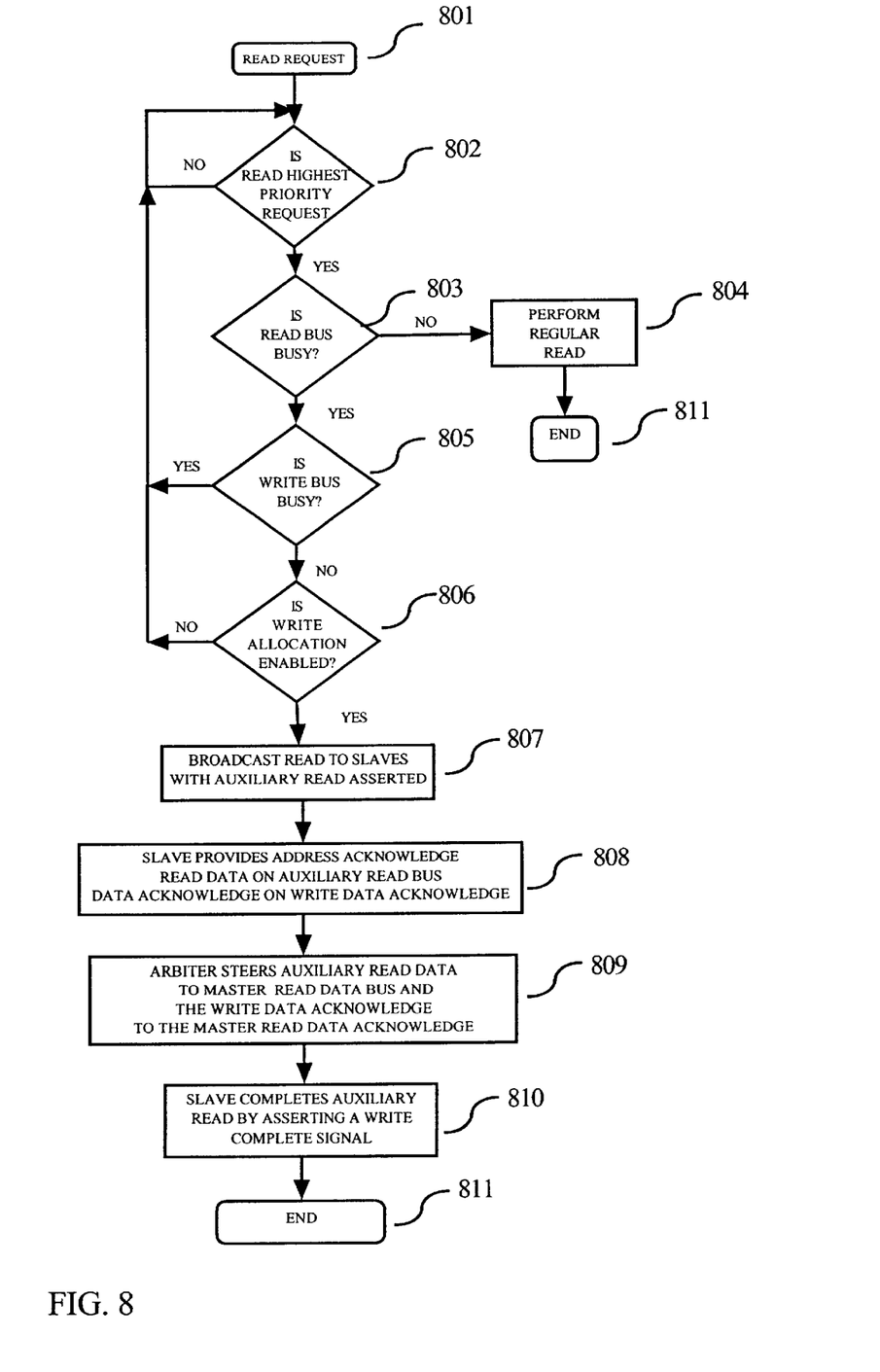
FIG. 8 is a flow diagram of method steps used in embodiments of the present invention.

FIG. 8 illustrates method steps in embodiments of the present invention. When a read request is received in step 801 a test of its priority is done in step 802. If the read request is not the highest priority request currently asserted, a wait is issued. If the read is the highest priority request, a test of whether the read data bus is busy is done in step 803. If the read data bus is not busy, a normal read is executed in step 804 and upon completion a wait for a new request is executed. If the read data bus is busy in step 803, then a test is performed in step 805 to see if the write data bus is busy. If the write data bus is busy, a return is issued to step 802. If the write data bus is not busy in step 805, the write allocation enable is checked in step 806. If the write allocation is enabled in step 806, an auxiliary read is asserted with a broadcast read to the slave devices. In step 808, a slave device claims the auxiliary read cycle, read data is sent to the auxiliary read data bus and the write data acknowledge is sent as a read data acknowledge to the appropriate master. In step 809, the arbiter steers the auxiliary read data bus data to the read data input of the appropriate master. In step 810, the slave that claimed the auxiliary read completes the cycle by asserting a write complete signal to the arbiter. The auxiliary read is ended in step 811.

While embodiments of the present invention are applicable to the IBM CoreConnect architecture, other chip vendors may have similar SOC core architectures, for example Advanced Microcontroller Bus Architecture (AMBA) from ARM Ltd in which embodiments of the present invention are applicable.

Although the present invention and its advantages have been described in detail, it should be understood that various changes, substitutions and alterations can be made herein without departing from the spirit and scope of the invention as defined by the appended claims.

What is claimed is:

1. A data bus system comprising:
   a first read data bus coupled to a plurality of slave devices;
   a second read data bus coupled to said plurality of slave devices;

a first write data bus coupled to said plurality of slave devices;

a plurality of master devices, said master devices operable to receive read data; send write data and receive read and write data acknowledge signals;

a first read data acknowledge bus;

a first write data acknowledge bus; and a bus arbiter, coupled to said plurality of master devices and said first and second read data bus, said first write data bus, said first read data acknowledge bus and said first write data acknowledge bus, said bus arbiter operable to monitor bus utilization of said first read data bus and said first write data bus, said bus arbiter granting bus access selectively to said master devices based on bus access priorities, said bus arbiter further asserting an auxiliary read signal in response to said bus utilization and bus access priorities; said bus arbiter simultaneously coupling data from a first slave device on said first read data bus and a second slave device on said second read data bus when said auxiliary read signal is asserted, wherein an acknowledge is asserted, from said second slave device using said second read-data bus, as a write data acknowledge and routed by said bus arbiter to a corresponding read data acknowledge of a master device receiving data from said second read data bus, said data from said second read data bus routed by said bus arbiter to a normal read input of said master device, wherein a bandwidth of a read operation is increased during unbalanced utilization of said first read data bus and said first write data bus.

2. The data bus structure of claim 1, wherein said plurality of devices comprise a CPU, a communications controller, a memory controller and a Peripheral Components Interface (PCI) bridge and said bus structure comprises a Processor Local Bus (PLB).

3. The data bus structure of claim 1, wherein said second read data bus and said first write data bus are a combined tri-state bi-directional bus.

4. A data processing system, comprising:

a central processing unit (CPU);

shared random access memory (RAM);

read only memory (ROM);

an I/O adapter;

a display adapter;

a display; and a data bus system coupling devices within said data processing system said data bus system comprising separate read and write data buses with a bus arbiter, said data bus system further comprising;

a first read data bus coupled to a plurality of slave devices, a second read data bus coupled to said plurality of slave devices;

a first write data bus coupled to said plurality of slave devices;

a plurality of master devices, said master devices operable to receive read data; send write data and receive read and write data acknowledge signals;

a first read data acknowledge bus;

a first write data acknowledge bus; and a bus arbiter, coupled to said plurality of master devices and said first and second read data bus, said first write data bus, said first read data acknowledge bus and said first write data acknowledge bus, said bus arbiter operable to monitor bus utilization of said first read data bus and said first write data bus, said bus arbiter granting bus access selectively to said master devices based on bus access priorities, said bus arbiter further asserting an auxiliary read signal in response to said bus utilization and bus access priorities; said bus arbiter simultaneously coupling data from a first slave device on said first read data bus and a second slave device on said second read data bus when said auxiliary read signal is asserted, wherein an acknowledge is asserted, from said second slave device using said second read data bus, as a write data acknowledge and routed by said bus arbiter to a corresponding read data acknowledge of a master device receiving data from said second read data bus, said data from said second read data bus routed by said bus arbiter to a normal read input of said master device, wherein a bandwidth of a read operation is increased during unbalanced utilization of said first read data bus and said first write data bus.

5. The data processing system of claim 4, wherein said plurality of devices comprise a CPU, a communications controller, a memory controller and a Peripheral Components Interface (PCI) bridge and said bus structure comprises a Processor Local Bus (PLB).

6. The data processing system of claim 4, wherein said second read data bus and said first write data bus are a combined tri-state bi-directional bus.

* * * * *